Figure 6:
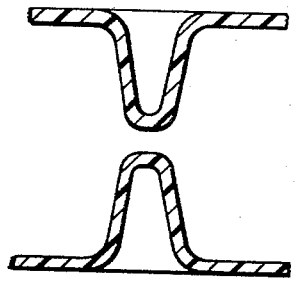

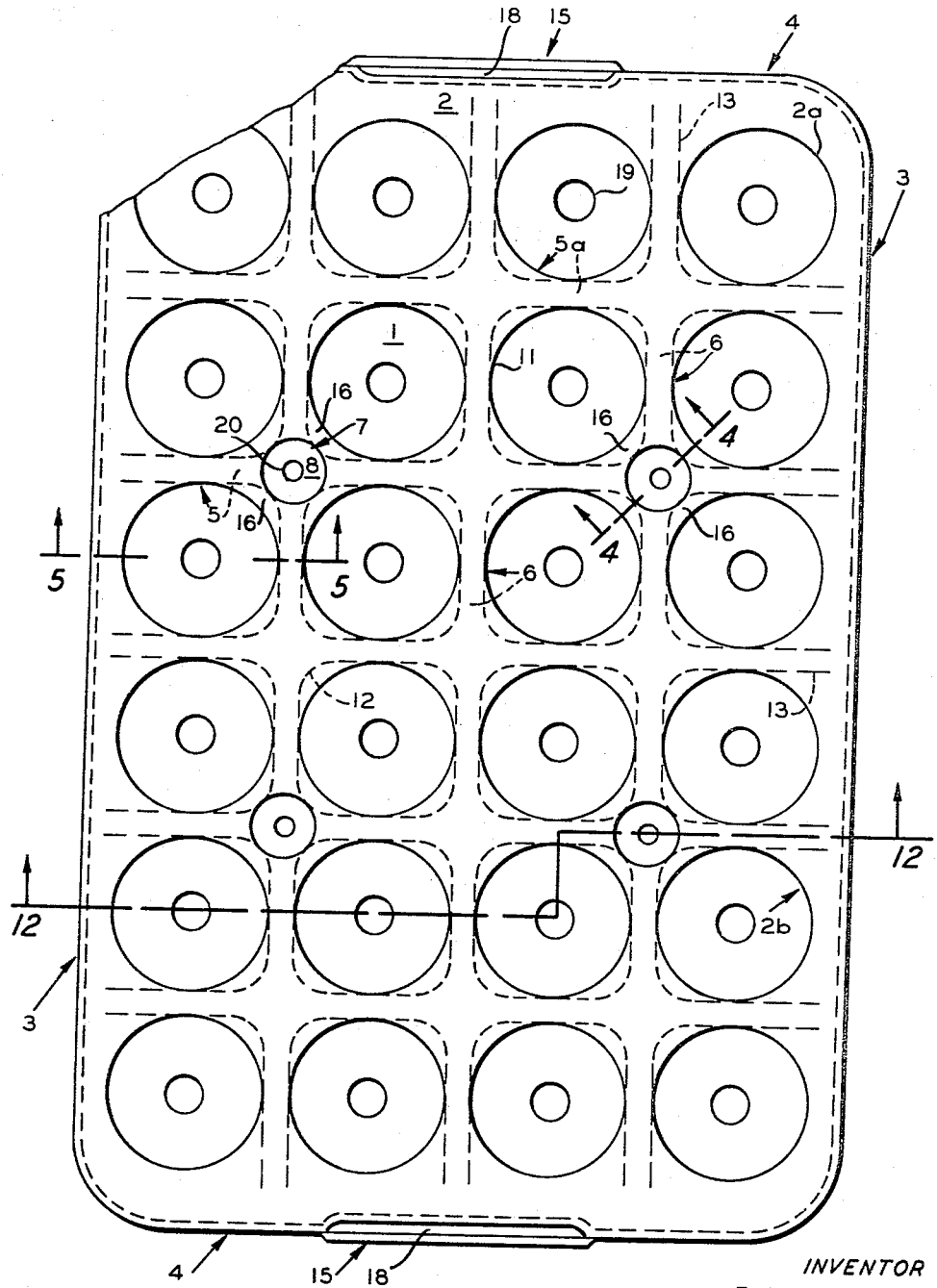
FIG. I
INVENTOR
E. R. MARTIN
BY
ATTORNEYS

Aug. 8, 1967  E. R. MARTIN  3,334,768
BOTTLE CRATES
Filed Jan. 28, 1966  4 Sheets-Sheet 2

INVENTOR
E. R. MARTIN
BY
ATTORNEYS

Aug. 8, 1967 E. R. MARTIN 3,334,768
BOTTLE CRATES
Filed Jan. 28, 1966 4 Sheets-Sheet 4

INVENTOR
E. R. MARTIN
BY
ATTORNEYS

United States Patent Office 3,334,768
Patented Aug. 8, 1967

3,334,768
BOTTLE CRATES
Edward R. Martin, Arkley, England, assignor to Phillips Petroleum Company, a corporation of Delaware
Filed Jan. 28, 1966, Ser. No. 523,731
3 Claims. (Cl. 220—21)

This application is a continuation-in-part of Ser. No. 254,820, filed Jan. 29, 1963, now Patent 3,246,790, which is a continuation-in-part of Ser. No. 242,155, filed Jan. 4, 1962, now Patent 3,220,596.

This invention relates to to bottle crates moulded in plastic and it is an object of this invention to provide an improved plastic bottle crate.

According to this invention, a bottle crate is characterized in that it is made of thermoplastic material and is further characterized in that it is provided with bottle separating means. The crate is preferably an integral structure moulded in one piece, preferably by blow moulding. The bottle separating means may comprise apertures in the top wall of the crate, or they may be provided inside the crate, that is by integral formations in the bottom wall of the crate, or by a separately formed structure inserted within the crate. The bottle separating means may comprise a combination of apertures in the top wall and means inside the crate. The integral bottle separating formations may be inward projections from the bottom and/or top wall. The inward projection from both the bottom and top walls may join together to form reinforcing pillars extending from the bottom wall to the top wall. In the preferred embodiment, these reinforcing pillars form also bottle separators. The pillars are arranged in rows and each bottle is positioned by four pillars. Each pillar is formed of a pair of meeting projections, as described above, the upstanding projection being about one-half of the height of the pillar. Each projection is splayed out towards its root, and each upstanding projection has four webs, so that in horizontal cross-section each upstanding projection is cruciform, with the edge of each web flaring outwardly from its top to its foot. These upstanding, webbed projections, which form the lower parts of the pillars, not only separate the bottles, but they also prevent a bottle jamming when inserted non-vertically. Integral carrying formations or handles may also be formed during moulding of the crate. Preferably these handles are provided in the form of apertures of what at least the upper edge is formed on a recessed portion of the wall of the crate and turned outwardly to provide a rounded handling surface.

In a preferred arrangement the projections are positioned and dimensioned to project inwardly between and engage the bottles of each unit group thereof. The unit group (cf. the term "unit-cell" as used in crystallography) is usually four bottles, i.e., the crated bottles lie in several rows with the bottles of one row opposite the bottles of the next. Should the bottles of one row be opposite the spaces of the next row, the unit group is three bottles.

Figure 7:
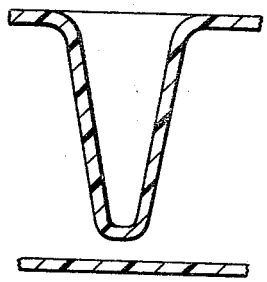
Figure 5:
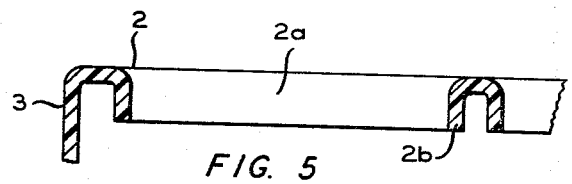
Figure 2:
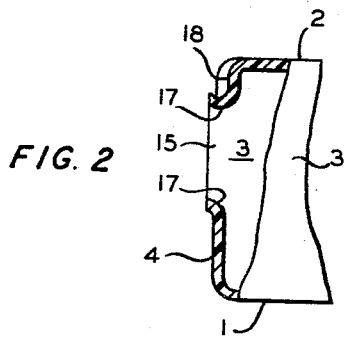
Figure 4:
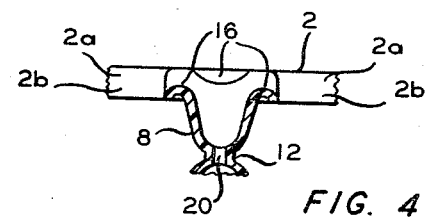
Figure 3:
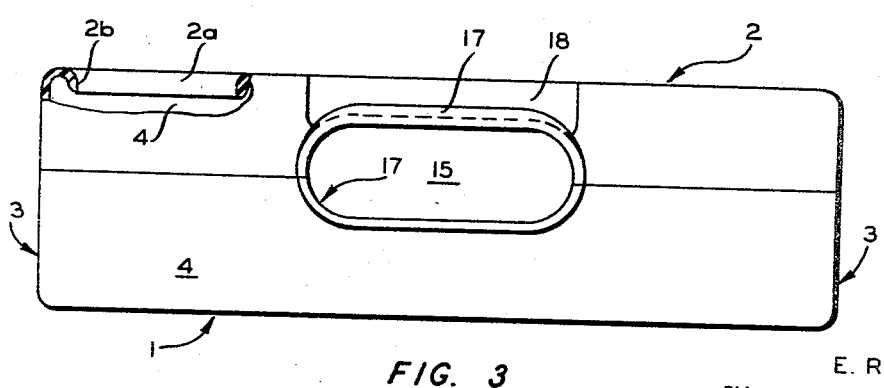
Figure 12:
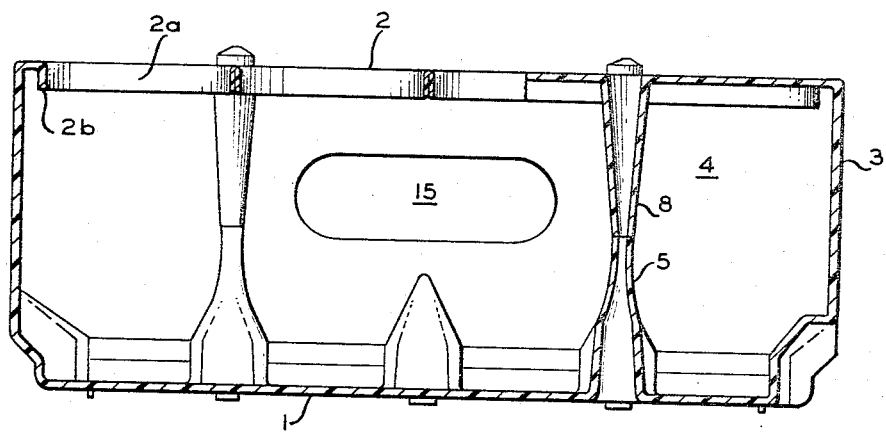
Figure 11:
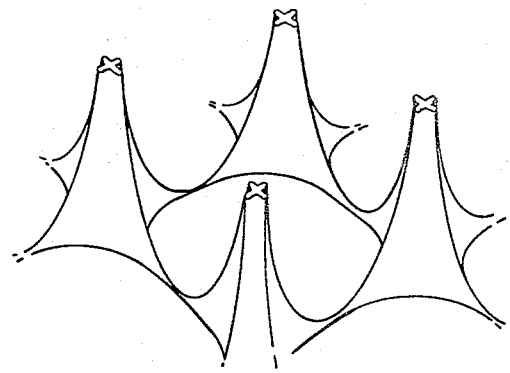

Various embodiments of the invention will now be described in more detail by way of example, with reference to the accompanying drawings, in which:

FIGURE 1 is a top plan of bottle crate;
FIGURE 2 is a partial side elevation, partly broken away and in section;
FIGURE 3 is an end elevation, partly broken way and in section;
FIGURE 4 is a partial section on the plane 4—4 of FIGURE 1;
FIGURE 5 is a cross-section of part of the crate taken along line 5—5 of FIGURE 1;
FIGURE 6 is a cross-section showing two opposed projections;
FIGURE 7 is a cross-section of a single pendant projection;
FIGURE 8 shows four similar forms (a, b, c and d) of strut;
FIGURE 9 shows a further form of strut; FIGURES 9a and 9b are taken along the lines 9a and 9b respectively of FIGURE 9;
FIGURE 10 shows a pair of struts forming part of a bottle locating formation;
FIGURE 11 shows a cluster of upward projections; and
FIGURE 12 is a cross-section through lines 12—12 of FIGURE 1 showing the interior structure of a crate.

The embodiment of a plastic bottle crate now to be described and in accordance with the invention, is an integral structure, formed by blow-moulding an extruded tubular thermoplastic parison in a two-part mould. The blow-moulding technique is well known per se and need not be described here, apart from stating that it is desirable in this case to commence blowing just before the mould parts meet to form the closed mould.

Referring now to the drawings, the crate has a bottom wall 1, a top wall 2, two side walls 3 and two end walls 4. The top wall is formed with twenty-four apertures 2a, since this embodiment of crate is designed to receive twenty-four bottles, which rest on the bottom wall 1 and project up through the apertures 2a, which act to keep the bottles separate from one another. Each aperture 2a is formed with a depending skirt 2b (FIGURE 3).

Referring to FIGURE 4, it will be noted that at each of the four areas 7, the four portions 16 of the top wall 2, which lie between the projections 8 and the holes 2a, are depressed.

Referring to FIGURE 3, one of the depending skirts 2b of the holes 2a is seen in section. These skirts 2b add to the strength of the top wall 2 and can be used in some instances to grip the bottles.

FIGURE 2 shows a handle aperture 15 having rounded lips 17. Above the handle aperture the end wall is recessed at 18.

There are drain holes 19 in the bottom wall 1 at each bottle location and there are drain holes 20 at the bottom of each downward projection 8 at the four areas 7.

Although only four areas 7 are shown, it will be understood that a crate could have more than four and in fact there could be downward projections 8 at every area between four holes 2a.

The holes 2a, 19, 20 are all cut out after the blow-moulding operation.

The handle apertures 15 are preferably formed during the blow-moulding operation, using cores.

The constructions illustrated in FIGURES 6–12 show various different forms which the projections from the bottom and/or top walls may take. Thus in FIGURES 6 and 7, there may be seen projections whose purpose is in part to limit the extent to which the top wall of the crate may be pressed down as shown by the gap between the opposed projections of FIGURE 6 or by the gap between the pendant projection of FIGURE 7 and the bottom wall of the crate.

In the variants shown in FIGURE 8, there may be seen four ways in which the projections form a continuous strut extending between the top and bottom walls of the crate; the variants (a) and (c) are formed by the union of opposed projections extending from the top and bottom walls of the crate, the other variants (b) and (d) being formed by the union of a pendant projection with the bottom wall of the crate. The projections of FIGURE 8a, b, c and d strengthen the carrier against lateral shear as well as reinforce the top wall of the crate. As thinner crates are formed, the projections from the top to the bottom wall provide requisite lateral strength, for example, if bottles in the crate are subjected to lateral force while the crate is held stationary, as well as maintaining the requisite distance between the top and bottom walls.

Figure 8A:
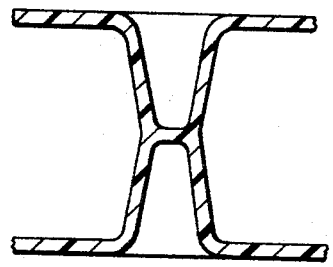
Figure 8B:
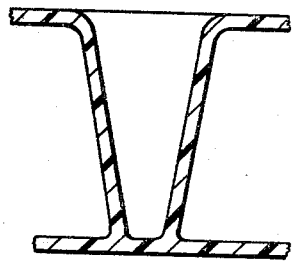
Figure 8C:
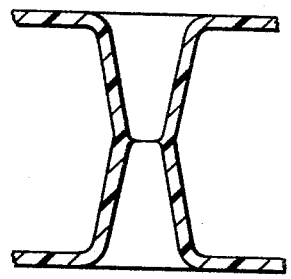
Figure 8D:
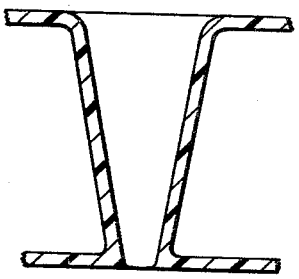
Figure 9:
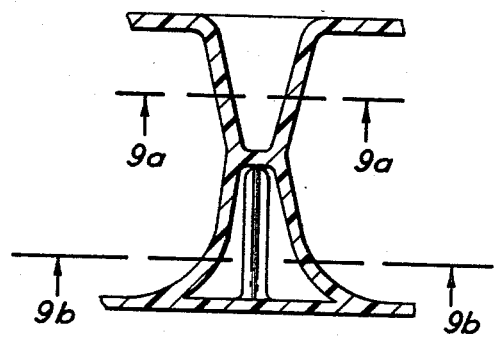
Figure 9A:
Figure 9B:
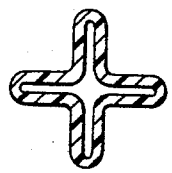
Figure 10:
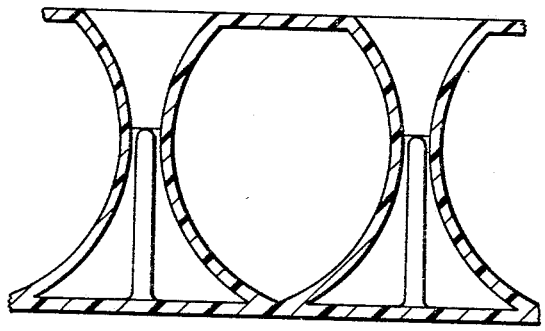

FIGURE 9 illustrates a variant of the strut of FIGURE 8a in which the projection from the bottom wall of the crate is made cruciform in cross-section (detailed in FIGURE 9b) whilst the upper portion of the strut which projects downwards from the top wall of the crate is circular in cross-section (detailed in FIGURE 9a); the cruciform cross-section is of value in forming recesses at the feet of the strut in order to provide a more positive location for the bottom of a bottle as may be realized from a considertaion of FIGURE 10 which shows a cross-section through two struts and the zone between bottle locations. The struts are similar to those of FIGURE 9.

FIGURE 11 shows a cluster of projections from the bottom wall of the crate and it can be seen from the perspective view given by this figure that the bottom projections are cruciform like the lower portion of the strut of FIGURE 9, and it can more clearly be seen from this view how the bottom of a bottle is positively located in the recesses formed by the cruciform cross-section.

In FIGURE 12, the interior of a carrier can be seen. A series of cruciform shaped projections 5 from the bottom wall 1 meet downwardly extending projections 8 from the top wall 2. The cruciform shaped projections from the bottom wall aid in positioning bottles in their respective places in the crate. The downwardly extending projections 8 can be fused to the projections 5 to the crate against lateral shear forces. A hollow passage between the top wall 2 and the bottom wall 1 can be maintained through the strengthening column. Means can be provided around the lower outer periphery of side walls 3 and end walls 4 for aiding in the positioning of bottles. As can be seen in FIGURE 1, the downward projections which form the strengthening columns are placed at least one aperture distance from each side wall and are symmetrically disposed in each of four equal quadrants of the top wall.

Other projections as hereinbefore disclosed could be used in place of projections 8. Further, more than four such projections or less than four projections could be used, or any combinations of projections as hereinbefore described could be used.

Reasonable variation and modification are possible within the scope of the foregoing disclosure, the drawing, and the appended claims to the invention, the essence of which is that a moulded in one-piece crate for bottles and similar articles has been provided, the crate comprising an integrally moulded one piece thermoplastic structure having top wall, bottom wall, and integrally formed substantially continuous side walls defining the sides of said crate, a plurality of article receiving apertures in the top wall, and bottle separating means inside the crate comprising upwardly displaced portions of the bottom wall, the upwardly displaced portions being adapted to engage the base of the bottle and position the same, the upwardly displaced portions coacting with downwardly displaced portions of the top wall to provide added strength to the crate.

I claim:
1. A crate for bottles and similar articles comprising
   (a) an integral moulded in one piece thermoplastic structure having a top wall, a bottom wall, and integrally formed substantially continuous side wall defining the sides of said crate;
   (b) a plurality of bottle receiving apertures in said top wall;
   (c) bottle separating means inside said crate comprising upwardly displaced portions of said bottom wall, said bottle separating means being so aligned to co-operate with said bottle receiving apertures to form a plurality of cells for the bottles, said upwardly displaced portions being adapted to engage the base of a bottle and thus position the same, each of said upwardly displaced portions being connected to each other only through said bottom wall, each of said upwardly displaced portions being separate from one another;
   (d) the upwardly displaced portions being located within said crate so that the bottles placed away from said side wall of said crate will be engaged at at least four points and bottles located adjacent said side wall will be engaged at at least two points by said upwardly displaced portions; and
   (e) said top wall containing four downwardly extending projection opposite four bottle separating means, the combination of said downward projection and said bottle separating means being adapted to reinforce said top wall of said crates, each of said downwardly extending projections and said bottle separating means being integrally joined to provide lateral strength to said container, each of said four downwardly extending projections being symmetrically disposed in each of four equal quadrants of said top wall and spaced at least one aperture distance from said side wall.

2. A crate according to claim 1 wherein said bottle separating means is cruciform shaped in cross-section.

3. A crate according to claim 1 wherein said bottle separating means and said downward projection comprise a one piece hollow cylinder between said top wall and said bottom wall, the pillar being tapered from the top wall to the bottom wall.

References Cited
UNITED STATES PATENTS

| 2,411,673 | 11/1946 | Veckey | 220—21 |
| 2,574,983 | 11/1951 | Reed | 220—21 |
| 3,106,308 | 10/1963 | Kazimier | 220—21 |
| 3,151,762 | 10/1964 | Vidal. | |

FOREIGN PATENTS 754,312   8/1956   Great Britain.

THERON E. CONDON, *Primary Examiner.*

RAPHAEL H. SCHWARTZ, *Examiner.*